United States Patent
Berthold et al.

[15] 3,653,487
[45] Apr. 4, 1972

[54] SHED SERVICE SCRAPER

[72] Inventors: Heinz Berthold, Rohrbach (Saar); Kurt Kamm, Hassel (Saar); Wolfgang Forster, Saarbrucken, all of Germany

[73] Assignee: Pohlig-Heckel-Bleichert Vereinigte Maschimenfabriken A.G.

[22] Filed: Sept. 9, 1969

[21] Appl. No.: 856,341

[52] U.S. Cl..................................................198/36, 214/10
[51] Int. Cl..................................................B65g 65/28
[58] Field of Search..............................214/10; 198/36, 10

[56] References Cited

UNITED STATES PATENTS

| | | | |
|---|---|---|---|
| 708,634 | 9/1902 | Gregg | 198/120 |
| 3,517,798 | 6/1970 | Strocker | 214/10 X |

FOREIGN PATENTS OR APPLICATIONS

| | | | |
|---|---|---|---|
| 1,148,425 | 4/1969 | Great Britain | 198/36 |
| 1,158,378 | 7/1969 | Great Britain | 198/36 |
| 648,720 | 11/1962 | Italy | 214/10 |

Primary Examiner—Gerald M. Forlenza
Assistant Examiner—Frank E. Werner
Attorney—Woodhams, Blanchard and Flynn

[57] ABSTRACT

A shed service scraper including a travelling gantry and a main scraper chain and an auxiliary scraper chain mounted thereon the scraper chains being adapted to be driven in opposite directions so that the auxiliary scraper chain conveys loosened materials to the working region of the main scraper chain.

7 Claims, 6 Drawing Figures

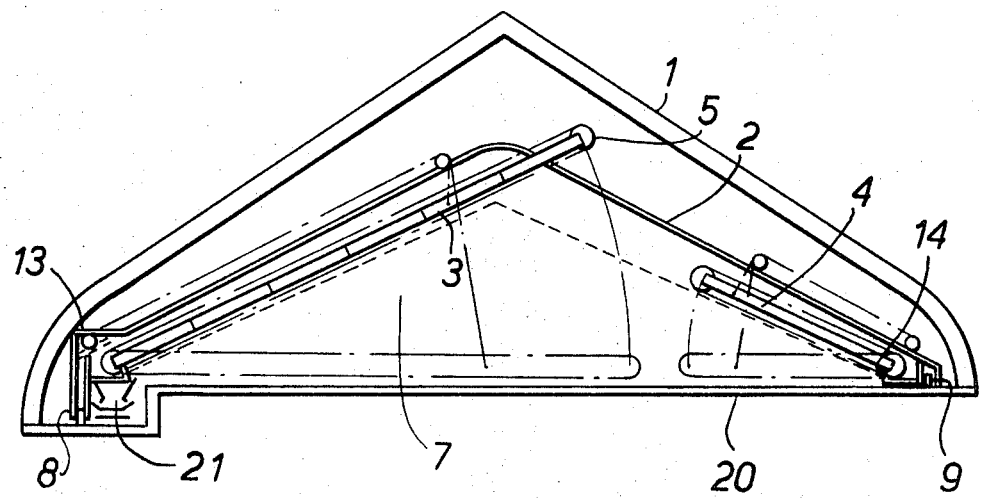
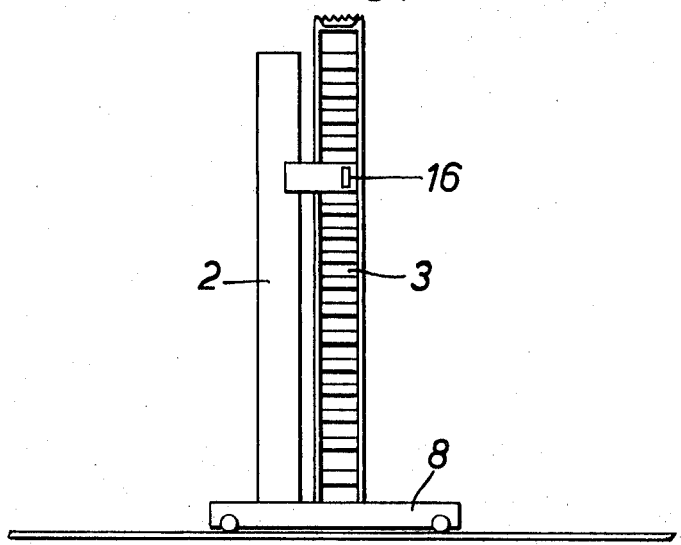

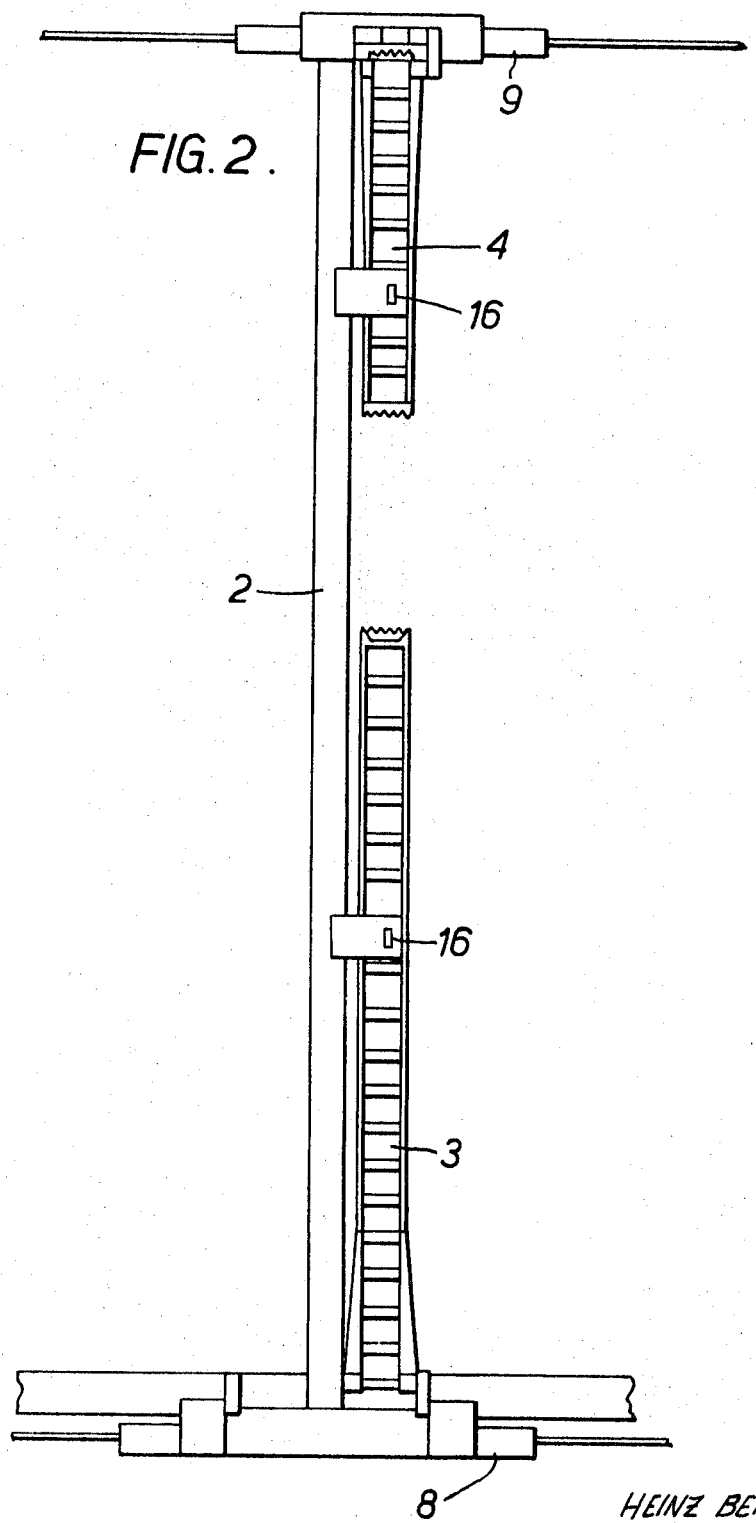

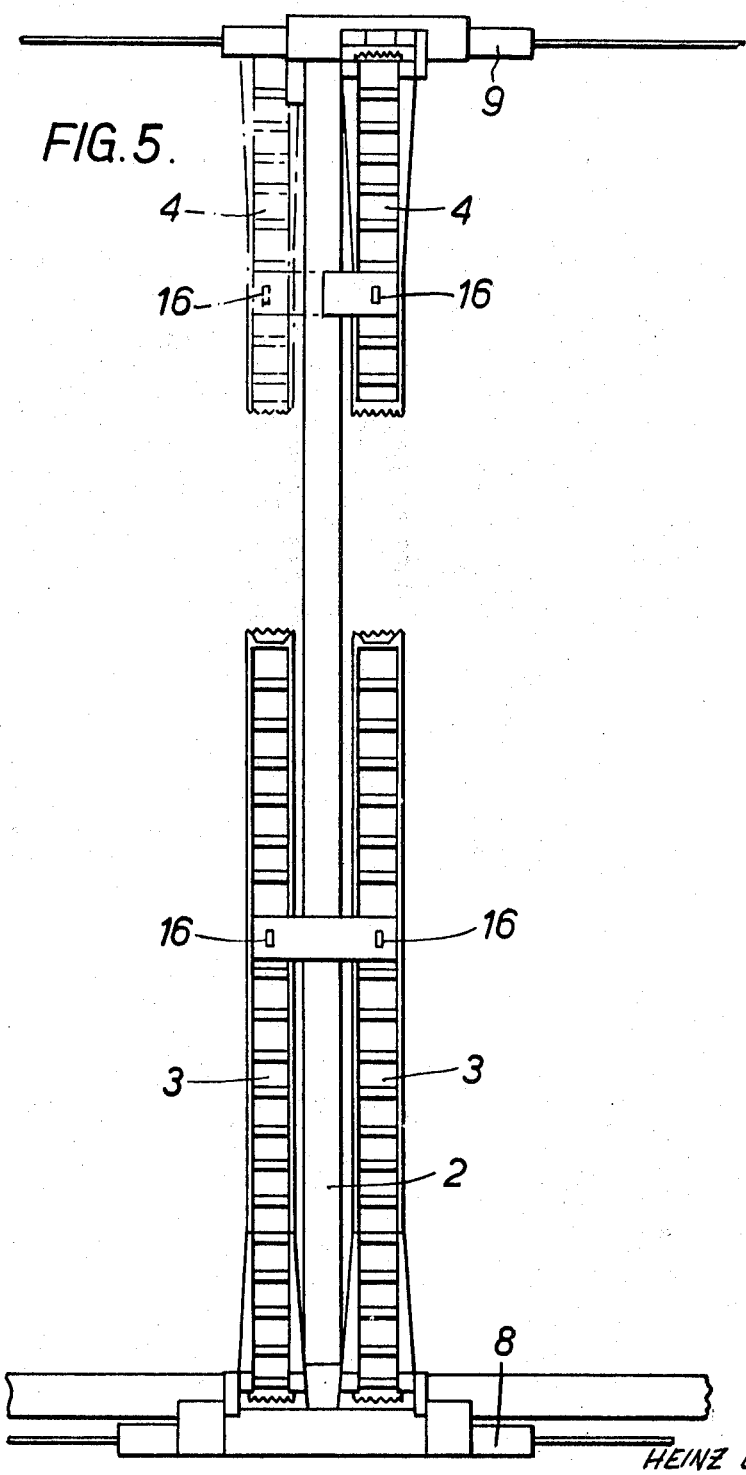

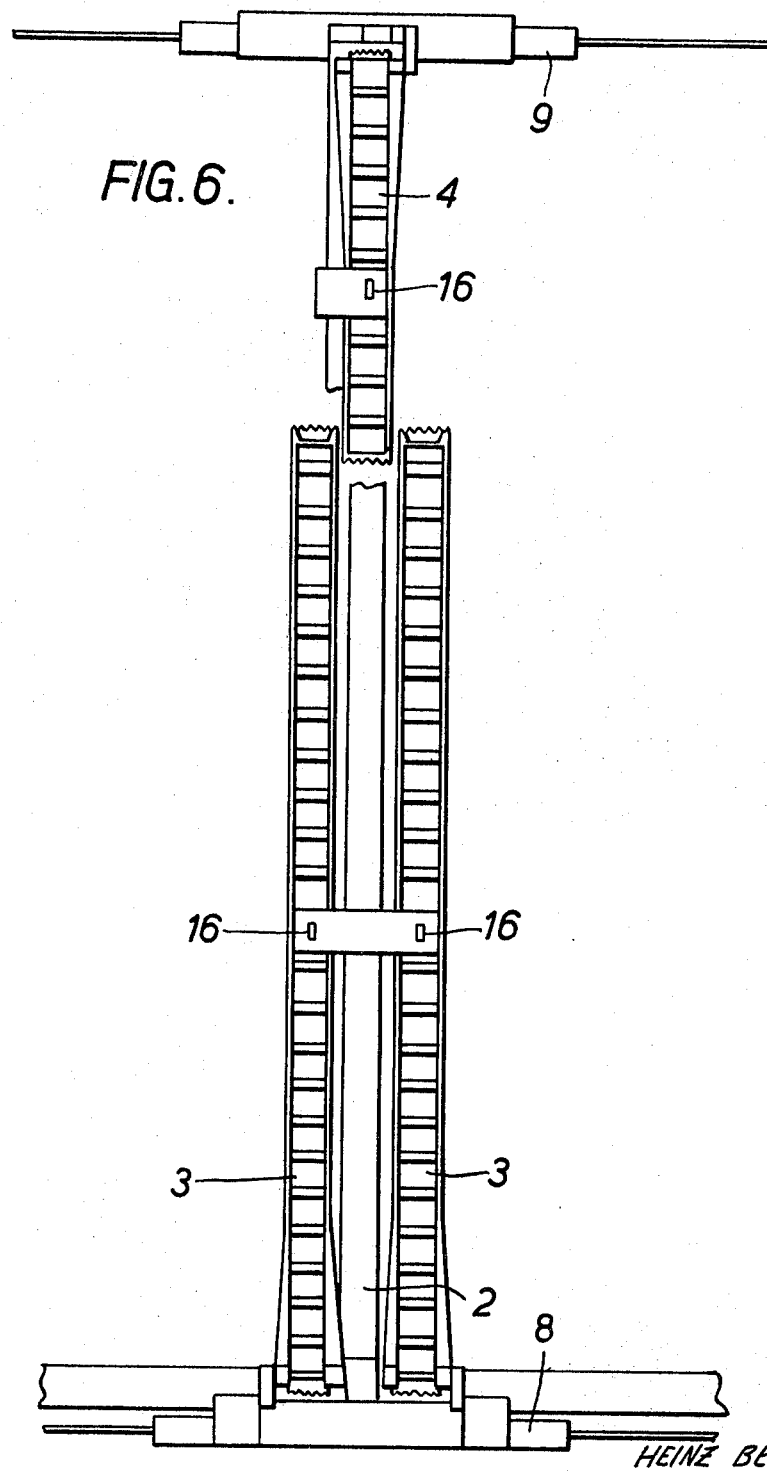

SHED SERVICE SCRAPER

The invention relates to a shed service scraper such as is used for breaking up (loosening) and removing bulk materials which have become agglomerated in the course of storage and which have been deposited in sheds or in the open.

In the known apparatus of this general kind an endless chain runs in a jib and is provided with scraper blades (combs) which extend transversely to the direction in which the materials are conveyed for their removal. These scraper blades or combs break up the materials which are to be removed and thrust them downwardly until they are finally delivered to a conveyor which lies downstream of the shed service scraper. The scraper is provided on a supporting car which travels along a track lying adjacent the site of the dump or mound of the material to be removed.

Another form of service shed scraper extends from the ground or base up to the highest point of the roof (cover) of the shed and travels along rails in the longitudinal center of the dump site or area; this form of service shed scraper is equipped with a jib which can be raised and lowered about the point at which it is suspended to the foot of the car frame and is also capable of turning about a vertical axis. This known form of service shed scraper does not permit large accumulations of material on the storage sites or in the storage shed; it is unsuitable for clearing bulk or loose material which form a mound or dump which occupies the whole width of the dump site.

Also known is a shed service scraper which is supported by a gantry which extends above and laterally of the whole dump site (area). As the scraper chain is suspended below the gantry and the means for lowering this scraper chain have to be interposed between the scraper chain itself and the gantry, the structural height of the gantry must exceed the height of the dumped materials to an appreciable extent. This entails either high costs for the gantry or results in only limited use being made of the available area of the dump site.

The invention has the object of so constructing a shed service scraper that, not only is adequate usage made of the available surface of the dump area or of the storage shed — the loose or bulk materials being accumulated on the dump site until they attain relatively great heights — but this shed service scraper will be found to be economic owing to its relatively low operating costs.

According to the invention this object is achieved by so constructing a shed service scraper, which is equipped with a traveling gantry, that scraper chains are articulated to the feet of the gantry or to the beams of the gantry which support the wheel mechanisms, one of these scraper chains serving as a main scraper chain which conveys the loosened material in the direction of the point at which this scraper chain is articulated to the shed service scraper and thus to the discharge conveyor which is located in the vicinity of this main scraper chain, while the other scraper chain, which functions as an auxiliary scraper chain, is adapted to be driven in the reverse conveying direction to that of the said main scraper chain; thus the auxiliary scraper chain conveys the loosened materials to the working region of the main scraper chain whose area for receiving the loosened materials lies close to the area of the auxiliary scraper chain from which these loosened materials are removed.

In accordance with the provisions of the invention it will be found convenient if the scraper chains have differing lengths, the main scraper chain when in its highest position extending to a point lying above the tip of the dump of deposited materials or above the gantry of the shed service scraper. It is recommended that the shed service scraper be so constructed that, as viewed in plan, its scraper chains lie, laterally of the gantry, either in a single longitudinal axis or displaced with respect to each other.

A very favorable form of construction of the invention is distinguished in that the scraper chains are offset with respect to one another, and the lengths of these scraper chains are so selected that the arcuate paths of travel described by the tips of these scraper chains overlap one another, so that the scraper chains pass over the whole cross-sectional area of the dump or mound of deposited material in the course of their working strokes.

A particularly satisfactory modification of the proposed, shed service scraper is characterized by the fact that the auxiliary scraper chain is articulated to the gantry of the scraper equipment through the intermediary of a link or tie bar. Conveniently, in this form of construction, the auxiliary scraper chain or the supporting frame for the latter and the link or tie bar which is articulated to this auxiliary scraper chain cooperates with one another and are connected to one another in a manner similar to that of the relationship between a connecting rod or thrust rod on the one hand and, on the other hand, a swivel lever or crank. In this particular form of embodiment of the invention that end of the auxiliary scraper chain which is articulated to the link (tie bar), pivot lever or the like lies, when it is in its raised position, that is to say in the position in which it is held by the upwardly shifted link or tie bar and in which it has been pivoted away from the foot of the gantry by this link or tie bar, at a greater distance — from an imaginary, vertical plane which is in alignment with the track of the gantry foot which is initially associated with the said link or tie bar — than in that position of the said articulated end of the auxiliary scraper chain in which it has been retracted by the downwardly moving link or tie bar in the direction towards the foot of the gantry and towards the base or floor of the storage area.

Conveniently, and in accordance with the provisions of the invention, the shed service scraper will be so constructed and operated that either the auxiliary scraper chain, which is connected to a link (tie bar), or the link (tie bar), pivot lever or the like alone, will be so moved, by a draw cable or by some other actuating mechanism, that the free, head end of the auxiliary scraper chain will approach sufficiently close to the head end of the main scraper chain to ensure that no bridge-shaped pile of residual dump material will be left behind after the scraping and clearing action of the equipment. In a preferred embodiment of the invention the link (tie bar), pivot lever or the like is so provided that the articulated end of the auxiliary scraper chain extends, when it is in its lowered position, as far as the supporting base or floor of the equipment or as far as the foot of the supporting wall along the dump of bulk material.

In accordance with a further modification of the invention the main scraper chain and the auxiliary scraper chain are so constructed and are so articulated to the gantry of the shed service scraper that the distance between the free, head ends of the horizontal lying main and auxiliary scraper chains is sufficiently small to ensure that a cornice-shaped or gusset-shaped column of residual dump material will not be left behind, in the space between the free, head ends of the two chain scrapers, after these chain scrapers have performed their scraping action; if such precautions were not taken, a gusset-shaped or cornice-shaped column of residual dump material could cause damage to the shed service scraper and could prevent its correct functioning. The nature and the consistency of the bulk, deposited materials which are to be removed by the scraper chains will determine how close the free, mutually facing head ends of the horizontally lying main and auxiliary scraper chains must be with respect to each other (that is to say how small the mutual distancing between these scraper chains has to be), for ensuring that, in the course of the functioning and lowering of the main scraper chain and of the auxiliary scraper chain to their lower, terminal position, no cornice-shaped or bridge-shaped wall of dump material will remain, after the scraping and clearing action of these scraper chains, between the two scraper chains, the presence of a bridge-shaped wall of residual material representing a possible source of damage to the shed service scraper itself and a threat to the correct operation of the shed service scraper. The mutual distancing between the adjacent lying head ends of the co-operating main scraper chain and auxiliary scraper chain may be determined by a man versed in the art from occasion to occasion on the basis of his reading of the foregoing description and also on the basis of his general knowledge of the art concerned; such deliberations on the part of a man versed in the art will not entail or require the exercise of inventive ingenuity.

It will be found expedient to equip the shed service scraper with a plurality of main scraper chains and auxiliary scraper chains.

In an advantageous form of construction of the invention there is provided, to either side (right and left) of the portal of the equipment and as seen in plan view, either a single main scraper chain or a plurality of such main scraper chains; either a single auxiliary scraper chain is provided or, alternatively, an auxiliary scraper chain is provided to either side (left and right) of the gantry. In this embodiment of the invention the main scraper chain and the auxiliary scraper chains are of differing length, so that it is ensured that these scraper chains, in the course of their working strokes, will pass over the whole cross-sectional area of the dump of material to be removed, and no bridge-shaped wall of residual material will remain behind.

Finally, it is proposed according to the invention to construct the gantry of the equipment as a box-shaped supporting construction of high torsional strength and to equip the inside of the gantry with a platform which serves to interconnect the two sides of the dump or tip.

According to a preferred form of construction of the shed service scraper the gantry is equipped with a rolling or traveling mechanism which includes, on one side of the track, flanged wheels and, on the other side of the track, wheels which are without flanges. One embodiment of the invention is diagrammatically illustrated by way of example in the accompanying drawings, in which:

FIG. 1 is a view of a shed service scraper whose scraper chains, which are articulated to the traveling gantry and are shown both in their uppermost and in their lowermost positions, are articulated laterally of the gantry of the shed service scraper;

FIG. 2 is a plan view of the shed service scraper;

FIG. 3 is a side elevational view of a shed service scraper;

Figure 4:
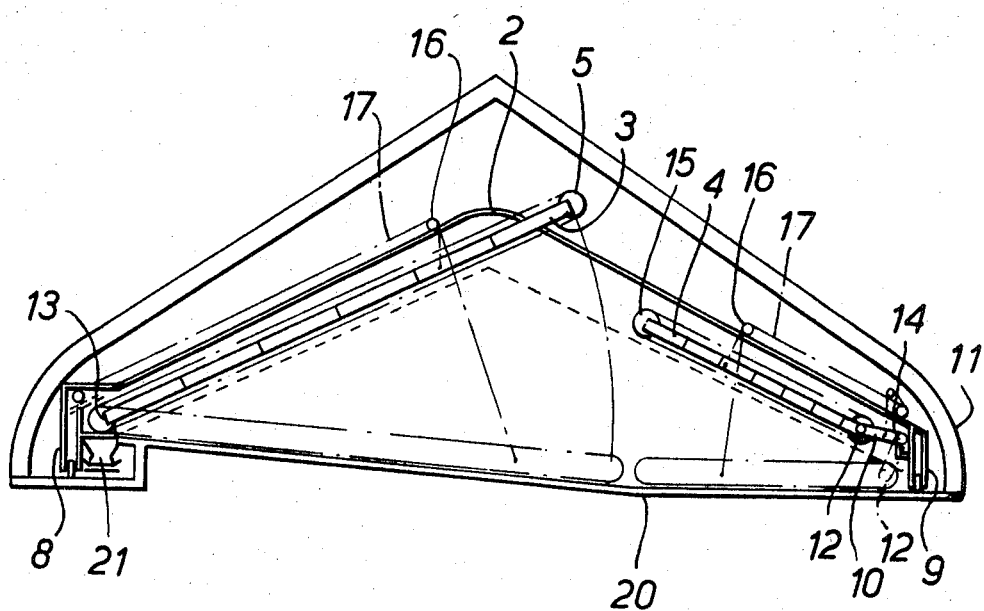

FIG. 4 is an elevation of a shed service scraper which differs from the shed service scraper represented in FIGS. 1 to 3 substantially by reason of the fact that its auxiliary scraper chain is articulated to the gantry by means of a link or tie bar. FIG. 4 shows the scraper chains both in their uppermost and in their lowermost positions. The end which is articulated to the link or tie bar and by means of which the auxiliary scraper chain engages with the link (tie bar) — in a manner similar to that in which a connecting rod is connected to a crank, swivel lever or the like — and is thus directly articulated to the foot of the gantry which is associated with the said end of the auxiliary scraper chain, is not only maintained in the uppermost position of the auxiliary scraper chain by the raised link (tie bar) but is also held at a greater distance — from an imaginary, vertical plane which is in alignment with the track of the gantry foot which is initially associated with the link (tie bar) — than when in its lowered position in which it has been retracted by the downwardly shifted link or tie bar in the direction of the gantry foot and of the base or floor on which the material is accumulated;

FIG. 5 is a plan view of a shed service scraper which is equipped with a plurality of main scraper chains and a plurality of auxiliary scraper chains. A main scraper and an auxiliary scraper chain is mounted laterally and on each face of the traveling gantry, and FIG. 6 shows an embodiment in which the auxiliary scraper chain is disposed between both main scraper chains.

The shed service scraper includes the main scraper chain conveyor 3 and the auxiliary scraper chain 4 conveyor, each of which includes an endless scraper chain and a swingable boom, mounted laterally of the gantry 2, which is provided to travel in a shed 1 represented in FIGS. 1 to 3 of the drawings.

The free end of the main scraper chain 3, which is rigidly constructed, is without kinks or bends, and is shown in its uppermost position in the drawing, projects beyond the vertical height of the frame or portal 2. In this way it is ensured in accordance with the invention that the scraper chain, when the latter is being lowered, will clear an appreciably greater quantity of bulk material than has hitherto been the case.

The supporting boom of the main scraper chain 3, is articulated to, the gantry foot 8 which is provided on one side of the mound or bank 7 of the deposited material; this main scraper chain boom is, more specifically, articulated to the swivel pin which is mounted in the portal 2 and lies close to the discharge conveyor 21. The supporting boom of the auxiliary scraper chain 4, is mounted (articulated) on the gantry foot 9 which is located on the other side of the mound or bank of deposited, bulk material 7; more specifically, the auxiliary scraper chain boom is mounted on the swivel pin 14 which is mounted in the gantry 2.

In the case of the shed service scraper which is shown in FIGS. 4 to 5 the main scraper chain 3 is articulated to the gantry foot 8, more specifically to the swivel pin 13 which is mounted in the gantry 2, and the auxiliary scraper chain 4 is articulated to a link or tie bar 10 which is in turn articulated to the gantry foot 9, or more specifically to the swivel pin 14 mounted in the gantry 2. The auxiliary scraper chain 4 is connected to the link or tie bar 10 in a manner resembling that of the connection of a connecting rod to a pivot lever.

In the drawing the running or wheel mechanism associated with the gantry foot 8 is designated as 18, and the wheel mechanism associated with the gantry foot 9 is designated as 19. An imaginary, vertical plane which is in alignment with the running or wheel mechanism 19 associated with the gantry foot 9 — this vertical plane extending perpendicularly of the plane of the drawing and of the supporting base or floor of the shed service scraper — is indicated by means of a line having the reference number 11. The end 12 articulated to the link or tie bar 10 of the auxiliary scraper chain 4, when it is in its raised position, in which it is held up by the upwardly shifted link or tie bar 10 and has been pivoted away from the gantry foot 9, is at a greater distance — from an imaginary, vertical plane 11 which is in alignment with the wheel or traveling mechanism of the gantry foot 9 which is initially associated with the link or tie bar 10 — than when this said end 12 of the auxiliary scraper chain 4 is in its lowered position, in which it has been retracted, by the downwardly swiveled tie bar 10, in the direction towards the tie bar 10 and towards the base or supporting surface 20.

The main scraper chain 3 and the auxiliary scraper chain 4 of the shed service scraper which is shown in FIGS. 1 to 5 are, according to particular requirements at any given time, raised and once again lowered through the intermediary of cables 17 which are guided over co-operating rollers 16, the main scraper chain 3 executing a vertical, pivotal movement about the swivel pin 13, and the auxiliary scraper chain 4 a vertical, pivotal movement about the swivel pin 14. The auxiliary scraper chain 4 of the shed service scraper illustrated in FIGS. 4 to 5 executes, on the other hand, when it is in process of being lowered or raised, a pivotal movement about the swivel pin 14; this pivotal movement is affected by the link or tie bar 10 owing to the fact that this tie bar 10 itself swivels about the swivel pin 14, describes an arcuate path of motion in the direction towards the heap of stored, bulk material which is to be removed, and causes the auxiliary scraper chain 4 to pivot about the swivel axis of the joint by means of which the head 12 of the auxiliary scraper chain 4 is articulated to the link or tie bar 10.

The auxiliary scraper chain 4 is pivotally swingable between raised and lowered positions about the pivotal connection between the inner end of the auxiliary scraper and the outer end of the link 10. The link 10 is also simultaneously vertically swingable about the swivel pin 14. Thus, when the auxiliary scraper 4 is in the vertically raised position, the link 10 extends inwardly on the foot 9 in a substantially horizontal position as illustrated by solid lines in FIG. 4. However, when the auxiliary scraper chain 4 is in the lowered position, the tie bar 10 has been pivotally moved into a substantially downwardly extending position, as illustrated by dotted lines in FIG. 4, which thus results in the inner end, namely the end 12, of the auxiliary scraper chain 4 being positioned more closely adjacent the foot 9. Since the inner end 12 of the auxiliary scraper chain 4 is moved laterally (horizontally) toward the foot 9 as the auxiliary scraper chain 4 is lowered, this also results in a lateral movement of the free end 15 toward the foot 9. Thus, the free end 15 of the auxiliary scraper chain, when in the uppermost position, is horizontally spaced from the vertical plane 11 by a greater distance than when the auxiliary scraper chain is in the lowered position. This thus results in the head or free end 15 of the scraper chain encompassing or traveling through a larger area than is possible when the scraper chain is mounted solely for pivotal movement, thereby permitting the head end 15 to travel through a path which is disposed more closely adjacent the path of the head end 5 of the main scraper chain 3. The link 10 thus effectively results in the auxiliary scraper chain 4 being simultaneously vertically pivoted and horizontally translated as it is moved between its raised and lowered positions.

In the course of operation of the shed service scraper the auxiliary scraper chain 4 delivers the bulk material to the main scraper chain 3. Only the main scraper chain 3 passes the loosened and removed bulk material on to the longitudinal roller conveyor which is located in the region of its foot. When the scraping work is commenced, that is to say when the mound or heap of accumulated material is undiminished in size, only the main scraper chain 3 functions, and it continues to operate until it has been lowered to a point below the auxiliary scraper chain 4 which is then in its uppermost position. Only at this time is the auxiliary scraper chain 4 switched on and then commences to transfer loosened bulk material on to the main scraper chain 3. Both chains 3 and 4 are uniformly lowered. The link or tie bar 10 holds the auxiliary scraper chain 4 in a prescribed position and retracts it in step with its own downwards, arcuate movement towards the foot 9 of the gantry 2. The different movements are so related to each other that the heads 5 and 15 of the two scraper chains 3 and 4 continuously lie close to one another, in side-by-side or superposed relationship, but never actually come into contact with one another.

The link or tie bar 10 offers two advantages. If the auxiliary scraper chain 4 were located directly in the foot region of the gantry 2, then both of these chains 3 and 4 would work their way into the bulk material which is to be cleared and would define between them a residual wall of material having approximately the shape of a bridge or of a cornice. This residual wall of material, left behind after the work of the scraper chains 3 and 4, may attain quite considerable heights and, if it falls down, may result in accidents occurring or in damage being caused to the materials-removing equipment, such damage being caused by the weight of the accumulated, bulk materials of approximately bridge-shape which are left behind. It is reliably ensured that such gusset-shaped walls will not be left behind owing to the fact that the heads 5 and 15 of both scrapers 3 and 4 lie sufficiently close to one another. The articulated connection of the auxiliary scraper chain 4 to the link or tie bar 10 also confers the advantage that the auxiliary scraper chain 4 is guided close to the foot of the gantry 2, which for many applications occurring in practice is secured by a wall against the stored heap of bulk material.

According to particular requirements at any given time the scraper chains 3 and 4 are either equipped with individual drives or with a common drive means. The driving or wheel mechanism of the gantry 2 is, on one side of the gantry 2, equipped with flanged wheels and, on the other side of the gantry 2, with flangeless wheels. In this way it is ensured that any widening of the track, which may occur owing to the gantry 2 possibly becoming bent, will not have deleterious consequences.

We claim:

1. In a scraper for removing materials from a storage mound, said scraper including a frame having spaced-apart first and second base portions and first and second scraper conveyor means extending substantially toward one another and having their outer ends pivotally interconnected to said first and second base portions, respectively, for vertical pivotal movement between raised and lowered positions, comprising the improvement wherein said first and second conveyor means have their inner ends positioned closely adjacent one another but free of interconnection to enable said first and second conveyor means to pivotally swing independently of one another, the free inner ends of said first and second conveyor means being disposed in nonoverlapping relationship in all operational positions thereof, even when said first and second conveyor means are disposed in said lowered position wherein said first and second conveyor means are substantially longitudinally aligned with one another, and connecting means coacting between the outer end of said second conveyor means and said second base portion for causing said second conveyor means to be horizontally translated in a direction away from said first conveyor means when said second conveyor means is pivotally swung toward its lower position, said connecting means including movable link means connected between said second base portion and said outer end of said second scraper conveyor means for causing said outer end of said second conveyor means to be moved both vertically and horizontally relative to said second base portion as said second scraper conveyor means is swung between said raised and lowered positions.

2. A scraper according to claim 1, wherein said link means comprises elongated lever means interconnected between said second conveyor means and said second base portion, said lever means being pivotally connected adjacent one end thereof to said second base portion for enabling said lever means to pivotally swing in a vertical plane substantially parallel to the vertical plane of movement of said second conveyor means.

3. A scraper according to claim 2, wherein the other end of said elongated lever means is pivotally connected to the outer end of said second scraper conveyor means for enabling said second scraper conveyor means to pivotally move relative to said lever means.

4. A scraper according to claim 2, wherein said first and second conveyor means are swingable in a common vertical plane and when in said lowered position are non-overlapping and substantially horizontally aligned, said second conveyor means when in said raised position being disposed to extend upwardly at a substantial angle relative to the horizontal, said lever means extending substantially horizontally when said second conveyor means is in said raised position, and said lever means extending substantially vertically downwardly when said second conveyor means is in said lowered position.

5. A scraper according to claim 2, further including actuating means connected to both said lever means and said second conveyor means for simultaneously causing vertical swinging movement of said lever means relative to said second base portion and vertical swinging movement of said second conveyor means relative to both said lever means and said second base portion.

6. A scraper according to claim 1, wherein the outer end of said first conveyor means is pivotally connected to said first base portion for enabling vertical swinging movement of said first conveyor means between raised and lowered positions, third conveyor means disposed closely adjacent the outer end of said first conveyor means for receiving thereon the material transported by said first conveyor means, and said second conveyor means being operated in the opposite direction from said first conveyor means whereby the material transported by said second conveyor means is transferred onto said first conveyor means for transport to said third conveyor means.

7. A scraper according to claim 1, wherein said frame means comprises a traveling gantry having an elongated rigid arch portion adapted to extend over a mound of material, said first and second base portions being fixedly secured to the opposite lower ends of said arch portion, each of said base portions having wheel means thereon for enabling rolling movement of said gantry in a direction substantially transverse to the elongated direction of said arch portion, and said first and second conveyor means being disposed for vertical swinging movement in substantially parallel planes which extend transverse to said direction of movement.

* * * * *